United States Patent [19]
Geweke

[11] 3,845,996
[45] Nov. 5, 1974

[54] BEARING SYSTEMS

[75] Inventor: Werner Geweke, Rodenberg, Germany

[73] Assignee: Padana AG, Zug, Switzerland

[22] Filed: Mar. 16, 1973

[21] Appl. No.: 342,149

[30] Foreign Application Priority Data
Mar. 20, 1972 Germany.............................. 2213513

[52] U.S. Cl. ................................................. 308/10
[51] Int. Cl. ........................................... F16c 39/06
[58] Field of Search .................... 308/10; 74/5, 5.47

[56] References Cited
UNITED STATES PATENTS

| | | | |
|---|---|---|---|
| 3,215,901 | 11/1965 | Carniol | 308/10 |
| 3,238,788 | 3/1966 | Arthur | 308/10 |
| 3,338,644 | 8/1967 | Atkinson | 308/10 |
| 3,508,445 | 4/1970 | Penney | 308/10 |
| 3,619,014 | 11/1971 | Quick | 308/10 |
| 3,650,581 | 3/1972 | Boden | 308/10 |

Primary Examiner—R. Skudy
Attorney, Agent, or Firm—Harness, Dickey & Pierce

[57] ABSTRACT

A magnetic bearing system for a body comprises electromagnetic coils for exerting magnetic forces on the body. A regulating device whose input is connected to a position sensor is adapted to produce corrective signals responsively to displacement of the body from a desired position. The corrective signals are fed to the coils via a complex impedance comprising two branches of which one contains a capacitor and the other contains a resistor or an inductor or a resistor in parallel with an inductor. Both branches can be in series with the same coil or each may be in series with a respective one of two separate coils which act on the body in the same direction. The complex impedance compensates for the increase in d.c. resistance of the coils as the frequency of the corrective signals increases and thereby enables voltage control to be used instead of current control.

11 Claims, 13 Drawing Figures

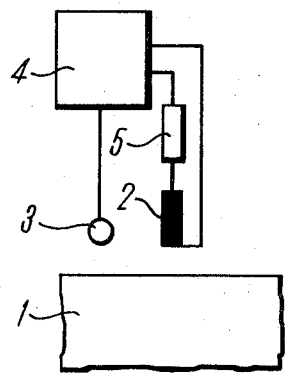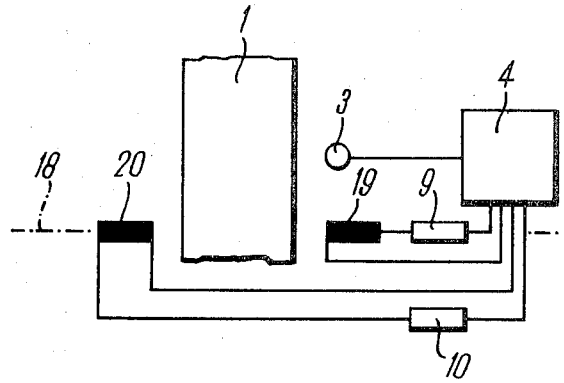
Fig.1　　　　Fig.2
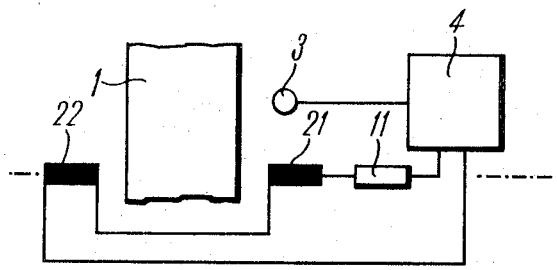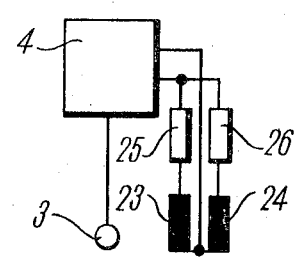
Fig.3　　　　Fig.4
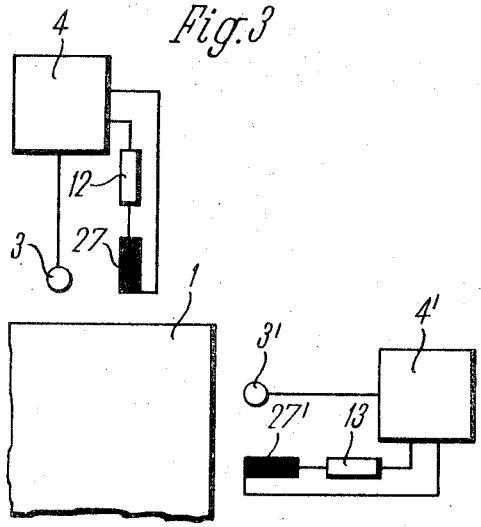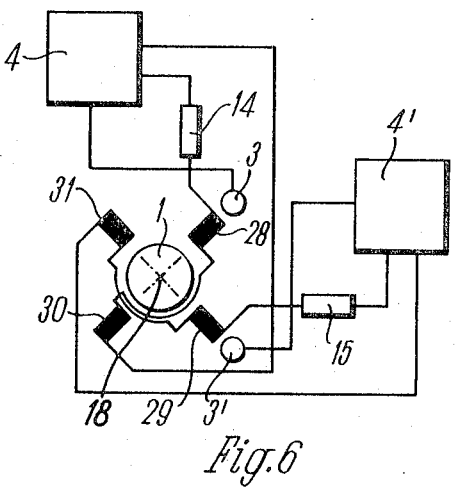
Fig.5　　　　Fig.6

BEARING SYSTEMS

The invention relates to magnetic bearing systems.

A DC-controlled magnetic bearing assembly is described in U.S. Pat. No. 3,650,581. A regulating device produces corrective signals for electromagnetic coils in accordance with error signals produced by sensors responsive to the displacement of the body from the desired position. The resistance of the electromagnetic coils is not independent of frequency, however, but on the contrary increases with the increasing frequency of the variations of the body in relation to its desired position picked up by the sensors (particularly in the case of rotating bodies) and correspondingly with increasing frequency of control signals fed to the electromagnetic coils to produce corresponding restoring forces. Since however the restoring forces, which must be produced as a function of the signals supplied by the sensors via appropriate control of the electromagnetic coils, must depend only on these and on the specific transmission characteristics of the regulating device, and must not depend on the frequency at the output of the regulating device, with the circuits known hitherto only a current control could be used, i.e. a current delivered as a function of the signals transmitted by the sensors had to be impressed in the output circuit of the regulating device leading to the electromagnetic elements. Current control also entails high supply voltages, which for their part — particularly with low frequencies — are associated with a high leakage power, converted into an output of heat. Control by voltage is not possible with these known arrangements due to the above-mentioned dependency of the current/voltage relationship on frequency and the phase position of current and voltage differing in relation to one another as a function of frequency.

The dependency on frequency of the known arrangements has a particularly disadvantageous effect, when the body mounted on the bearing is a rotating body, for example a very high speed pump rotor which is mounted magnetically and therefore contactlessly on a bearing. In such a case the dependency on frequency described above has the further disadvantage, that the regulating device is over-driven by signals which are synchronous with the speed of rotation, i.e. it responds to signals which are produced by irregularities of the rotor itself (rotor out of true, etc.), signals which are not due to a displacement of the axis of rotation of the rotor from its desired position and which must therefore also not be used to produce magnetic restoring forces acting on the body. This is particularly the case, when the rotor is rotating in the critical speed range, i.e. above the speed at which the natural frequency of the regulating circuit lies.

The above-mentioned disadvantages are believed to occur with all known types of DC-controlled magnetic bearings. "DC-controlled" is understood to refer to bearings with which the control of the electromagnetic coils is not produced by an AC-carrier modulated with the actual control value, but by the control value itself. The term "DC-control" used is not in contradiction to the fact that the control value is itself subject to fluctuations, which — particularly with rotating bodies — are periodic and therefore make it necessary to take into account the dependency on frequency of the output circuit of the regulating device.

When working with current control with DC-controlled magnetic bearings, i.e. with an impressed current, regulated as a function of the regulating value, to control the electromagnetic coils the further disadvantage is found that apart from the above-mentioned disadvantage of having to use a higher supply voltage, the reversal of the direction of effect, possible in itself, in this case requires costly equipment compared with the voltage control system. If this is avoided or if we work with electrical premagnetisation, this results in the necessity for a high power.

One aim of the invention is to avoid the described disadvantages of the above-mentioned known type of DC-controlled magnetic bearing assemblies.

Another aim of the invention is to provide a DC-controlled magnetic bearing assembly which has a considerably lower power requirement than the previously known bearing assemblies.

A further aim of the invention is to provide a DC-controlled magnetic bearing assembly in which, for electromagnetic elements of identical size, lower supply voltages are required than those required for the previously known bearing assemblies.

A further feature of the invention is to provide a DC-controlled magnetic bearing assembly in which it is possible to control the electromagnetic elements by the voltage.

Another feature of the invention is to provide a DC-controlled magnetic bearing assembly in which the power loss for control caused by the dependency on frequency of the electromagnetic elements is reduced.

A further feature of the invention is to provide a DC-controlled magnetic bearing assembly in which the leakage converted into thermal output is as low as possible.

A further aim of the invention is to provide a DC-controlled magnetic bearing assembly for rotating bodies with which the possibility of an overdriving of the regulating device by current signals synchronous with speed, particularly in the critical speed range, is reduced to a minimum.

According to the present invention, a DC-controlled magnetic bearing system for a body, comprises electromagnetic means for exerting magnetic forces on said body, sensors responsive to displacement of the body from a desired position, a regulating device to which the sensors are connected for producing corrective signals for the electromagnetic means, and circuitry between said regulating device and said electromagnetic means for conducting said corrective signals to the latter, said circuitry having two handles of which one comprises a capacitor and the other comprises an inductor or a resistor or a parallel circuit of a resistor and an inductor.

The transmission of the signals to the electromagnetic means via a capacitor compensates for the frequency dependence of the voltage/current ratio in the output circuit of the regulating device and the resultant necessarily higher supply voltage for the electromagnetic means. The simultaneous transmission of the signals via an inductor and/or a resistor ensures that at low frequency the capacitor does not have a dominant control over the resistance in the output circuit of the regulating device. By means therefore of the system in accordance with the invention by which the signals are transmitted on the one hand via a capacitor, and on the other hand via an inductor or a resistor or a parallel circuit of the latter two, a transmission path for the transmission of the low-frequency and static signals is obtained, and also is a transmission path for the high-frequency signals via the capacitor. If in each respective direction of force only one electromagnetic means is provided, the invention can be realised by connecting a complex impedance in series with this electromagnetic means, the complex impedance being formed by the parallel connection of a capacitor with an inductor and/or a resistor. If however there are two electromagnetic means acting to produce forces in a given direction, one electromagnetic means can be supplied with signals via a resistor, and the other via the capacitor, so that the impedances which are connected in series respectively with the two electromagnetic means (acting in one direction of force), form the components of a complex impedance constituted by a capacitor and the parallel connection of an inductor or a resistor.

Due to the independence from frequency obtained in the control range concerned, a voltage control of the electromagnetic means is made possible which in comparison with the previously necessary current control gives a considerable saving in power. Since however integrated circuits are available for circuits of the type required for voltage control, but not for circuits of the type required for current control, by using the system in accordance with the invention control can be effected with a considerable simplification of circuitry compared with that possible with previously known types of DC-controlled magnetic bearings.

Independence of frequency obtained for the output circuit of the regulating device eliminates the above-mentioned disadvantage of the control system being influenced by signals synchronous with speed, above all in the critical speed range with the possible resultant overdriving.

The system in accordance with the invention is also suitable for controlling rotary-symmetrical field displacement coils using annular windings. It makes it possible, using the above-mentioned advantages and eliminating the above-described disadvantages of known types of circuits, to fit two electromagnetic means in each direction of force and to control these via various components of the complex impedance formed by a capacitor on the one hand and by an inductor and/or resistor on the other hand.

It is furthermore possible to combine the series circuit of two electromagnetic means, which are mounted on the magnetic bearings symmetrically to the body to be mounted on the bearing, into a "unit" and to control them connected one after the other. This gives, in the case of bearing surfaces having two times two electromagnetic means, an arrangement analogous to that of a rotary field coil, which is particularly advantageous for the magnetic bearing of rotating bodies.

The invention is further described, by way of example, with reference to the accompanying drawings, in which:

FIG. 1 is a schematic representation of a bearing arrangement in accordance with a first embodiment of the invention;

FIG. 2 is a schematic representation of a second embodiment of the invention;

FIG. 3 is a schematic representation of a third embodiment of the invention;

FIG. 4 is a schematic representation of a fourth embodiment of the invention;

FIG. 5 is the representation of a "fully"-magnetic bearing plane using two arrangements in conformity with FIG. 1;

FIG. 6 is a schematic representation of a bearing plane for a rotating body using two arrangements in accordance with FIG. 3;

Figure 7:
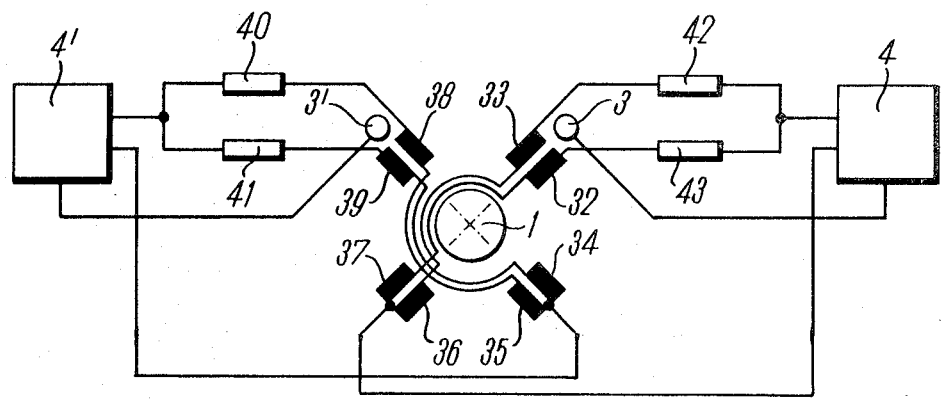
FIG. 7 is a schematic representation of a magnetic bearing plane for a rotating body corresponding to a combination of the arrangements shown in FIGS. 3 and 4.

FIG. 1 shows the simplest case of an application of the invention to a DC-controlled magnetic bearing. The term "DC-controlled" has already been explained. The bearing serves to mount a body 1. It is held in position by means of an electromagnetic means 2 by the force which the latter exercises on it. This position is scanned by a sensor 3. The sensor 3 is responsive to variations in the position of the body 1 from its desired position and supplies corresponding input signals to a regulating device 4, which as a function of these input signals controls the current in the electromagnetic means 2. Up to this point the DC-controlled magnetic bearing arrangement shown constitutes the known type mentioned above and reference may be made to the above-mentioned U.S. Pat. No. 3,650,581 for a fuller description of the construction of the regulating device 4 and the manner in which it operates. Coils are used as "electromagnetic means." In the embodiments of the invention described below coils are used throughout as the electromagnetic means.

FIG. 1 shows a bearing in which the force produced by the coil 2 acts in one direction on the body 1. In FIGS. 2, 3. 6, 7, 8, 10, 11 magnetic bearings are shown which act as bearings for rotating bodies. As can be seen however from the embodiment shown in FIGS. 1, 4 and 5, the invention is not restricted to bearings for rotating bodies, but can be applied in general to the magnetic mounting of bodies in one or several planes.

Figure 9:
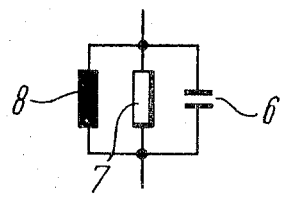
FIG. 9 is a representation of the complex impedances used in the arrangements of FIGS. 1 to 8.

In accordance with the invention a complex impedance 5 is connected in series with the coil 2, the impedance 5 being, as can be seen from FIG. 9, formed by two parallel-connected branches of which one comprises a capacitor 6 on the other, in the embodiment shown in FIG. 9, comprises a resistor 7 and an inductor (coil) 8 in parallel therewith.

This complex impedance has the function, described in more detail below, of compensating for the dependency of the current flowing through the coil 2 on frequency and determining the force exerted on the body 1 in the output circuit of the regulating device 4 under a given voltage, and the dependency on frequency of the phase displacement between the current in the coil 2 and the voltage at the output of the regulating device 4.

The capacitor is shunted at low frequencies either by the resistor 7 or by the inductor 8 or by the parallel connection of the two, so that as a result the high frequency output signals from the regulating device 4 are conducted via the capacitor 6, and the low frequency output signals from the regulating device 4 are conducted via the circuit components connected in parallel with the capacitor 6, i.e. in the embodiment shown in FIG. 9, via the inductor 8 and the resistor 7.

The complex impedance 5, as connected in series with the coil 2 in the first embodiment can as a variation from the arrangement shown in FIG. 9 can be formed with the branch comprising the capacitor being connected in parallel with another branch which comprises an inductor alone or a resistor alone.

Figure 8:
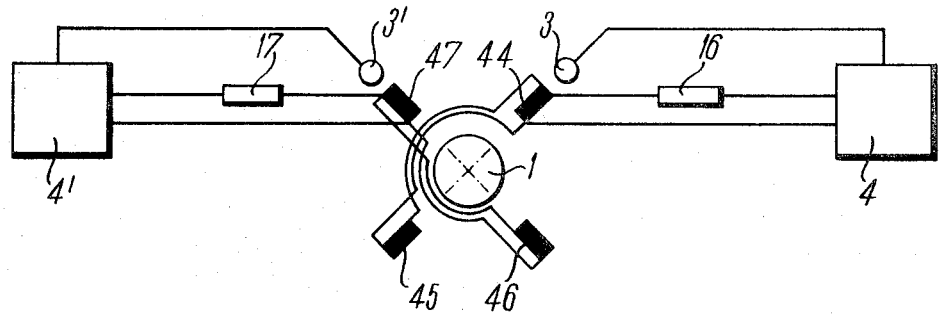
FIG. 8 is a further representation of a magnetic bearing plane of a bearing arrangement in accordance with the invention.

The complex impedances 9 and 10 shown in FIG. 2, the complex impedance 11 shown in FIG. 3, the complex impedances 12 and 13 shown in FIG. 5, the complex impedances 14 and 15 shown in FIG. 6, and the complex impedances 16 and 17 shown in FIG. 8, are also formed and can be varied as described with reference to FIGS. 1 and 9. Other parts in FIGS. 2 to 8 like those of FIG. 1 are denoted by like reference numerals.

FIG. 2 shows a further embodiment of the invention in which the body 1 is mounted on the magnetic bearing in the direction shown by broken line 18 (mounting perpendicularly to the line 18 is achieved by means which are not relevant here, cf. however the above identified patent specification). In this case there are two coils 19 and 20. There is also, as in FIG. 1, a sensor 3 which measures the displacements of the body 1 from its desired position and which transmits signals via the regulating device 4 to the two coils 19 and 20 which restore the body to its desired position. Each coil 19 or 20 is connected in series with a respective complex impedance 9 or 10, which has a form identical to that of the complex impedance 5 already described with reference to FIGS. 1 and 9. Differential forces are then produced by the difference between the forces exerted by the coils 19 and 20 and act on the body 1. This gives a symmetrical system.

FIG. 3 shows an arrangement which differs from that shown in FIG. 2 in that the two coils 21 and 22 are connected in series with one another and together with the complex impedance 11. Such a very simple series circuit connecting the two coils along line 18 is only possible if there is no premagnetisation by a null current. Once again, as with FIGS. 1 and 2, a voltage control is possible, made possible by the impedance of the voltage/current ratio from frequency over the regulating range.

As a variation of the embodiment shown in FIG. 3, the two coils 21 and 22 can alternatively be connected in parallel and these two parallel-connected coils can be connected in series with a complex impedance 11 and, as in FIG. 3, and thereby applied to only one output of the regulating device 4 (see also FIG. 8).

In the embodiment shown in FIG. 4 there are two coils 23 and 24 which act on the body 1 in the direction indicated by the broken line. In this case the coil 3 is connected in series with a circuit element 25, and the coil 24 with a circuit element 26. One of the circuit elements 25 and 26 is constituted by a capacitor, the other by an inductor, a resistor or a parallel circuit of an inductor and a resistor. This arrangement ensures that, the one of the two coils 23 and 24 which is connected in series with a resistor or a parallel circuit formed by a resistor and an inductor becomes effective at low frequencies, and that the other of the two coils 23 and 24 which is connected in series with the capacitor becomes effective at high frequencies. The two circuit elements 25 and 26 when considered together have the same components as the complex impedance shown in FIG. 9 constituted by a capacitor 6, a resistor 7 and an inductor 8. The difference is that the branches of the complex impedance shown in FIG. 9 are separated into two different series circuits with two coils 23 and 24 and correspondingly two lines from the regulating device 4. In this case therefore the "functions" of the coils are separated; one is dominant only for DC current and low frequencies, the other is dominant for high frequencies. This provides a considerable simplification.

In the arrangement shown in FIG. 5 two magnetic bearings, of the kind shown in FIG. 1, act in different directions on a body 1. The first bearing comprises the sensor 3, the regulating device 4, a complex impedance 12 and a coil 27; the second bearing comprises a sensor 3', a regulating device 4', a complex impedance 13 and a coil 27'. The embodiment shown in FIG. 5 shows how "fully" magnetic bearing planes can be produced by having several magnetic bearings acting in different directions on a body in accordance with the invention.

FIG. 6 shows a further embodiment of the invention very important for practical applications. In this embodiment, the rotating body 1 is held in radial directions (for mounting in an axial direction cf. e.g. the above identified patent specification) by coils 28, 29, 30, 31. Displacements of the rotating body from its desired position (i.e. from the desired position of its axis of rotation 18) are detected by the sensors 3 and 3', which transmit corresponding output signals to the regulating devices 4 and 4'. The output of the regulating device 4, controls the two series-connected coils 28 and 30 via the complex impedance 14; the regulating device 4' controls the two series-connected coils 29 and 31 via the complex impedance 15. The complex impedances 14 and 15 are formed as described for the arrangement illustrated in FIGS. 1 to 9. In the arrangement shown in FIG. 6 there are in principle two arrangements each of the kind shown in FIG. 3.

The arrangement shown in FIGS. 7 is produced by a combination of the two arrangements shown in FIGS. 3 and 4. The magnetic bearing of the body 1 rotating around rotation axis 18 is produced by eight coils 32, 33, 34, 35, 36, 37, 38, 39, arranged in four pairs. The coil pairs 32 and 33, 34 and 35, 36 and 37, 38 and 39 acts in a respective direction. Each coil pairs lie opposite another. Each two opposing coils each belonging to a respective pair of coils are connected in series with a circuit element. Thus the circuit elements similarly constitute the branches of a complex impedance including a capacitor as already described in connection with the arrangement shown in FIG. 4. Thus the series connection of the two coils 37 and 32 is connected in series with a capacitor 43, and the series connection of the coils 36 and 33 is connected in series with a resistor or an inductor 42 or with a parallel circuit of a resistor and an inductor. The series circuit of the two coils 35 and 38 is connected in series with a capacitor 40; the series connection of the two coils 34 and 39 is connected in series with a resistor or an inductor 41 or with a parallel circuit of a resistor and an inductor. The action of the two coil pairs respectively corresponds to that of the two individual coils 21 and 22 in FIG. 3, the action of the two coils 32 and 33 constituting a pair of coils corresponds to that of the pair formed by the coils 23 and 24 in FIG. 4. The two coil pairs 32 and 33, 36 and 37 are connected to the output of the regulating device 4, the two coil pairs 34 and 35, 38 and 39 to the output of the regulating device 4'.

The arrangement shown in FIG. 8 is identical from the point of view of coil arrangement to that shown in FIG. 6, but the coils are not connected in series as in FIG. 6, but in parallel. The parallel circuit of the two coils 44 and 45 is connected in series with the complex impedance 16; the parallel circuit of the two coils 46 and 47 is connected in series with the complex impedance 17. The parallel circuit of the coils 44 and 45, which are together connected in series with the complex impedance 16, is connected to the output of the regulating device 4, controlled by the sensor 3. The parallel circuit of the coils 46 and 47, series-connected with the complex impedance 17, is connected to the output of the regulating device 4', controlled by the sensor 3'.

The operation of the bearing assemblies in accordance with the invention will now be described with the aid of the graphs shown in FIGS. 12 and 13 measured and calculated for the circuits shown in FIGS. 10 and 11.

Figure 12:
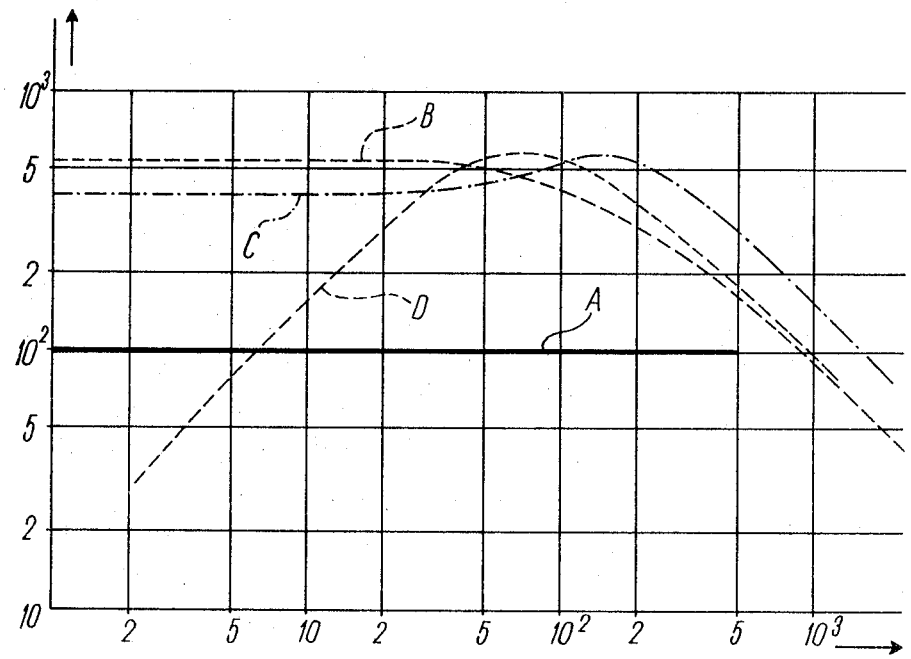
FIGS. 12 and 13 are graphs which for various control factors for the electromagnetic means used for the magnetic bearing in conformity with the invention, show curves for force and phase lead and phase lag.

FIG. 12 shows with logarithmic scales along both axes the dependency of the maximum attainable force which is exerted by a coil on the body 1 upon frequency in the case of a magnetic bearing with the given parameters (supply voltage, electromagnetic means, angular frequency). FIG. 13 shows the phase relationship between force and output signal of the regulating device as a function of the frequency with a logarithmic scale along one axis.

Figure 13:
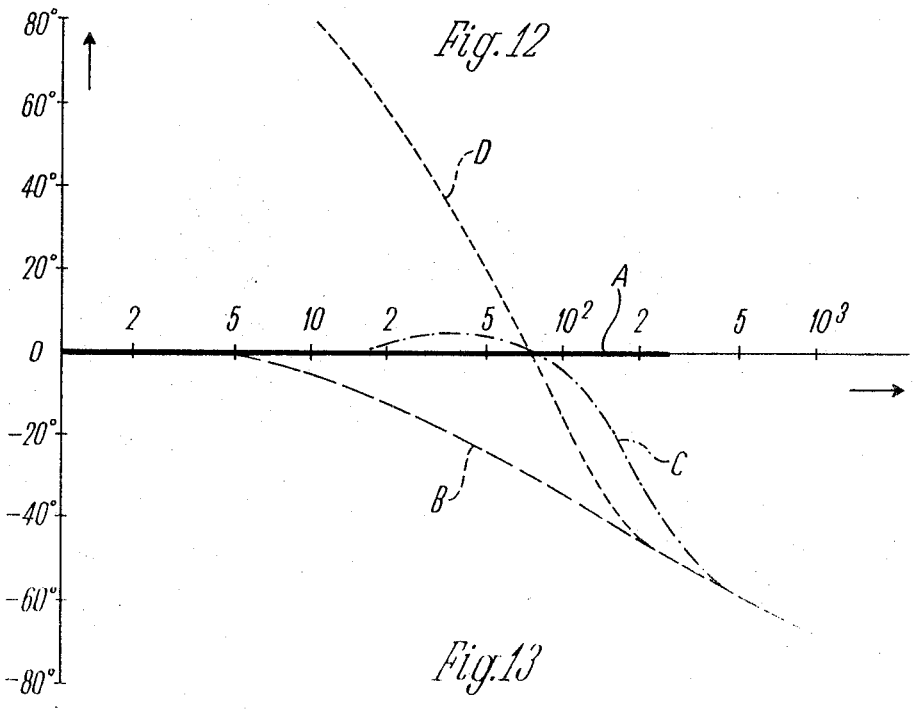

The current control, as applied in known arrangements, is indicated in FIGS. 12 and 13 by the curve A. This impresses by definition a constant current. No phase displacement occurs between force and current.

Curves B in FIGS. 12 and 13 show the dependency of force and phase displacement on frequency with voltage control of the coils without the features of the invention, i.e. they show the result of using voltage control with known types of DC-controlled magnetic bearings, if it is desired to avoid the above-mentioned disadvantages of current control, but without the features of the invention. This is therefore a case of voltage control of a simple coil. As may be expected, the force which is proportional to the current in the coil decreases as the frequency increases (cf. FIG. 12). With increasing frequency there is also a phase lag (FIG. 13).

Figure 11:
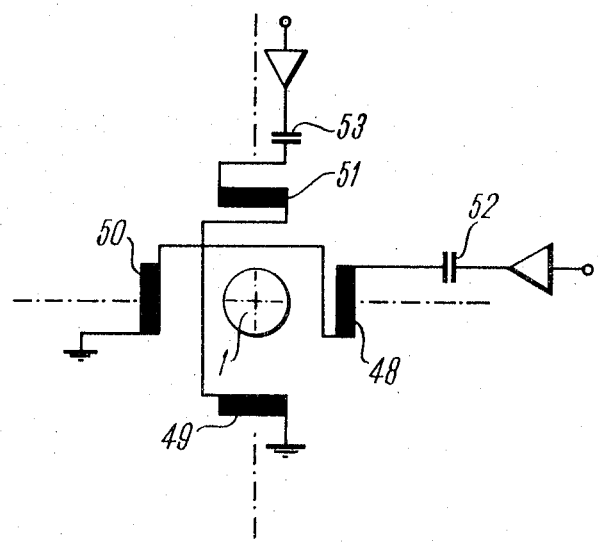
FIG. 11 is a schematic representation of a magnetic bearing plane giving the curves D in FIGS. 12 and 13.

Curves D in FIGS. 12 and 13 show the dependence of force and phase displacement upon time for a circuit in accordance with FIG. 11. Such a bearing can be used as a central bearing for a flexible elongated rotor to produce damping forces in a predetermined frequency range. In this embodiment coils 48, 49, 50, 51, are used for voltage control. The coils 48 and 50, or 49 and 51, are connected in series and form coil pairs which are each connected in series with a capacitor 52 or 53 respectively.

This produces the typical behaviour of a series oscillating circuit, i.e. maximum force is attained at a particular frequency which in FIG. 12 lies between 50 and 100 Hz. There is a reduction in force on both sides of this maximum, both towards lower frequencies and towards higher frequencies. In the range of frequencies below the maximum force there is a phase lead increasing in proportion to the reduction in frequency, and in the range of frequencies above the maximum force there is a phase lag increasing in proportion to the increase in frequency (FIG. 13).

Figure 10:
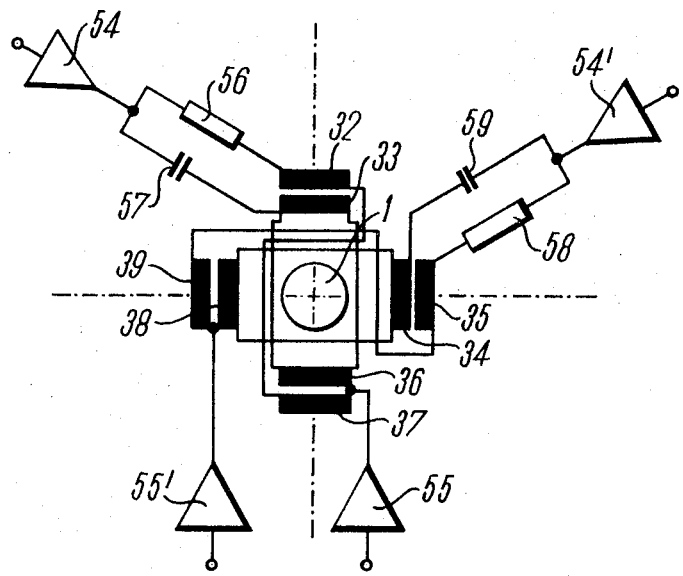
FIG. 10 is a further schematic representation of a magnetic bearing plane for a rotating body (as for FIG. 7), giving the curves C in FIGS. 12 and 13.

Curve C in conclusion shows the behaviour of a circuit in accordance with FIG. 10, representing an embodiment of the invention which is very important from the point of view of practical application. The circuit shown in FIG. 10 essentially corresponds to that described with reference to FIG. 7. The difference in comparison with the circuit shown in FIG. 7 is that each of two opposite coil pairs is controlled from both sides via amplifiers 54 and 55 or 54' and 55', and a rotary symmetrical field displacement coil is used. Coils 32 and 37 are connected in series with one another and are also connected in series with the resistor 56. Coils 33 and 36 are connected in parallel and the parallel circuit which they form is connected in series with a capacitor 57. The result of this is that a respective coil of each coil pair 32 and 33, 34 and 35, 36 and 37, 38 and 39 is supplied with the output signals of the regulating device via a capacitor, and the other coil via a resistor i.e. via circuit elements which form the components of a complex impedance comprising a resistor and a capacitor. The curves C in FIGS. 12 and 13 apply to the circuit shown in FIG. 10. Once again (cf. FIG. 12) a force which is constant over a very wide range is obtained. It then drops (at a frequency which is higher than the resonance frequency of the series oscillating circuit formed by the capacitor and the inductance of the coil). Within the range limited in this way the curve C does however run approximately in the same direction as the curve A, i.e. it is to a great extent independent of frequency. The same applies, as can be seen from FIG. 13, to phase displacement. Here also the voltage control made possible by the invention makes it possible to attain an efficiency largely equivalent to that of the previously known current control system which is however much more expensive in its circuitry and much less favourable from the point of view of performance.

The characteristic frequency (angular frequency) of the circuit shown in FIG. 2 can be obtained by appropriate dimensioning of the circuit elements. Above the frequency at which the curve C reaches a maximum in FIG. 12, there is an increasing fall in regulating forces, which are synchronous with speed, with increase in frequency. This reduction, which becomes possible with voltage control, also constitutes a considerable advantage of the invention.

I claim:

1. In a D.C. controlled magnetic bearing system for a body having electromagnetic means comprising magnetizing coil means for exerting magnetic forces on said body, sensor means for producing error signals responsive to displacement of said body from a predetermined position and regulating means for producing corrective signals for said magnetizing coil means responsively to said error signals: the improvement comprising circuitry having two branches each disposed to conduct said corrective signals from said regulating means to said magnetizing coil means, one of said branches comprising capacitor means and the other of said branches comprising at least one of resistor and inductor means.

2. A magnetic bearing system according to claim 1 in which said circuitry branches are connected to form a complex impedance in series with said magnetizing coil means, said complex impedance containing a capacitor.

3. A magnetic bearing system according to claim 1 in which said circuitry branches are connected to form a complex impedance in series with two said magnetizing coil means which are disposed to act on the body in opposite directions and are connected in series with one another, said complex impedance containing a capacitor.

4. A magnetic bearing system according to claim 1, in which two said magnetizing coil means are disposed to act in the same direction on said body, and in which said branch comprising capacitor means is connected in series with a first of said two magnetizing coil means and said branch comprising at least one of resistor and inductor means is connected in series with a second of said two magnetizing coil means.

5. A magnetic bearing system according to claim 2, further comprising second magnetizing coil means for exerting forces on said body in a different direction to the first-mentioned magnetic forces and a second complex impedance for conducting corrective signals to said second magnetizing coil means.

6. A magnetic bearing system according to claim 1, in which said regulating means is adapted to produce corrective signals in the form of voltage signals dependent on the error signals produced by the sensors.

7. A magnetic bearing system as set forth in claim 1 wherein the other of the branches comprises a parallel circuit of a resistor and an inductor.

8. In a D.C. controlled magnetic bearing system for a body having electromagnetic means for exerting magnetic forces on said body, sensor means for producing error signals responsive to displacement of said body from a predetermined position and regulating means for producing corrective signals for said electromagnetic means responsively to said error signals: the improvement comprising a first pair of electromagnetic means are disposed to act on the body in opposite directions and connected in series with one another, circuitry having two branches each disposed to conduct said corrective signals from said regulating means to said first pair of electromagnetic means, one of said branches comprising capacitor means in series circuit with said first pair of electromagnetic means and the other of said branches comprising at least one of resistor and inductor means, a second pair of electromagnetic means disposed to act in opposite directions on said body different from the first-mentioned opposite directions and a further complex impedance connected in series with said two further electromagnetic means.

9. In a D.C. controlled magnetic bearing system for a body having electromagnetic means for exerting magnetic forces on said body, sensor means for producing error signals responsive to displacement of said body from a predetermined position and regulating means for producing corrective signals for said electromagnetic means responsively to said error signals: the improvement comprising circuitry having two branches each disposed to conduct said corrective signals from said regulating means to said electromagnetic means, one of said branches comprising capacitor means and the other of said branches comprising at least one of resistor and inductor means, said electromagnetic means comprising four pairs of said electromagnetic means disposed to act on said body with the two electromagnetic means of each pair acting in the same direction on said body, two said pairs of electromagnetic means disposed opposite one another in relation to the body and acting in opposite directions on the body to be controlled, the other two pairs of electromagnetic means being disposed opposite each other in relation to the body and acting in opposite directions on the body, said opposite directions being different from the first-mentioned opposite directions, one electromagnetic means of one of the two first-mentioned pairs being connected in series with a respective electromagnetic means of the opposite pair and said branch comprising capacitor means and the other electromagnetic means of said one pair being connected in series with the other electromagnetic means of the opposite pair said branch comprising at least one of resistor and inductor means and said other two pairs of electromagnetic means being similarly connected in series with branches of further circuitry, the latter branches comprising further capacitor means and further at least one of resistor and inductor means.

10. A magnetic bearing system according to claim 1, in which said circuitry branches are connected to form a complex impedance in series with two said magnetizing coil means which are disposed opposite one another in relation to said body and are connected in parallel with one another.

11. In a D.C. controlled magnetic bearing system for a body having electromagnetic means for exerting magnetic forces on said body, sensor means for producing error signals responsive to displacement of said body from a predetermined position and regulating means for producing corrective signals for said electromagnetic means responsively to said error signals: the improvement comprising circuitry having two branches each disposed to conduct said corrective signals from said regulating means to said electromagnetic means, one of said branches comprising capacitor means and the other of said branches comprising at least one of resistor and inductor means, said electromagnetic means comprising two pairs of said electromagnetic means disposed opposite to one another in relation to said body, one electromagnetic means of one pair being connected in series with one electromagnetic means of the opposite pair and one of said branches and the other electromagnetic means of said one pair being connected in parallel with the other electromagnetic means of said opposite pair and the resulting parallel circuit being connected in series with the other of said branches.

* * * * *